United States Patent
Liu

(10) Patent No.: US 11,513,780 B2
(45) Date of Patent: Nov. 29, 2022

(54) METHODS, BLOCKCHAIN NODES AND STORAGE MEDIA FOR DEPLOYING SMART CONTRACT

(71) Applicant: ALIPAY (HANGZHOU) INFORMATION TECHNOLOGY CO., LTD., Zhejiang (CN)

(72) Inventor: Qi Liu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/357,179

(22) Filed: Jun. 24, 2021

(65) Prior Publication Data
US 2021/0342133 A1 Nov. 4, 2021

(30) Foreign Application Priority Data
Aug. 31, 2020 (CN) .......................... 202010901437.8

(51) Int. Cl.
*G06F 9/44* (2018.01)
*G06F 8/41* (2018.01)
(Continued)

(52) U.S. Cl.
CPC .............. *G06F 8/443* (2013.01); *G06F 21/57* (2013.01); *H04L 9/30* (2013.01); *H04L 9/50* (2022.05)

(58) Field of Classification Search
CPC ...................................................... G06F 8/443
(Continued)

(56) References Cited

U.S. PATENT DOCUMENTS

| 8,387,022 B2* | 2/2013 | Horning ................. G06F 21/14 717/127 |
| 10,649,429 B2* | 5/2020 | Orsini .................... G06Q 50/06 |

(Continued)

FOREIGN PATENT DOCUMENTS

| CN | 104318135 | 1/2015 |
| CN | 104408371 | 3/2015 |

(Continued)

OTHER PUBLICATIONS

Brown [online], "EOS 2.0 Announced With Multi-threading and EOS VM JIT Compiler," Oct. 7, 2019, retrieved on or before Jul. 7, 2021, retrieved from URL <https://www.kompulsa.com/2019/10/07/eos-2-0-released-with-multi-threading-and-eos-vm-jit-compiler/>, 5 pages.

(Continued)

*Primary Examiner* — Evral E Bodden
(74) *Attorney, Agent, or Firm* — Fish & Richardson P.C.

(57) ABSTRACT

A computer-implemented method, non-transitory, computer-readable medium, and computer-implemented system are provided for deploying a smart contract in a blockchain network. The computer-implemented method includes: receiving, by a blockchain node in a blockchain network, a transaction for creating a smart contract, wherein the transaction comprises a machine code of the smart contract, and the machine code of the smart contract is obtained by Ahead of Time (AoT) compilation of a bytecode of the smart contract in a first trusted execution environment (TEE); determining, by the blockchain node, that the machine code of the smart contract is obtained in a trusted TEE; and in response to determining that the machine code of the smart contract is obtained by the trusted TEE, completing, by the blockchain node, a deployment of the smart contract.

21 Claims, 8 Drawing Sheets

(51) Int. Cl.
  *G06F 21/57* (2013.01)
  *H04L 9/30* (2006.01)
  *H04L 9/00* (2022.01)
(58) Field of Classification Search
  USPC .......................................................... 717/151
  See application file for complete search history.

(56) References Cited

U.S. PATENT DOCUMENTS

| | | | |
|---|---|---|---|
| 11,049,099 B2 * | 6/2021 | Yan ..................... | G06Q 20/0658 |
| 2016/0065376 A1 * | 3/2016 | Smith ................... | H04L 63/123 |
| | | | 713/171 |
| 2017/0063532 A1 * | 3/2017 | Bhattacharyya ........ | G06F 21/76 |
| 2019/0171485 A1 * | 6/2019 | Bolkhovitin .............. | G06F 8/52 |
| 2019/0303932 A1 | 10/2019 | Klaedtke | |
| 2019/0373472 A1 * | 12/2019 | Smith ................... | H04W 12/35 |
| 2020/0351074 A1 * | 11/2020 | Wood .................... | H04L 63/067 |
| 2021/0165890 A1 * | 6/2021 | Schvey ................. | H04L 9/3297 |
| 2021/0174911 A1 * | 6/2021 | Sharda .................. | G06F 21/602 |

FOREIGN PATENT DOCUMENTS

| | | | | |
|---|---|---|---|---|
| CN | 105164642 A * | 12/2015 | ......... | G06F 9/45512 |
| CN | 107342858 | 11/2017 | | |
| CN | 109766722 | 5/2019 | | |
| CN | 110032883 | 7/2019 | | |
| CN | 110033368 | 7/2019 | | |
| CN | 110249307 | 9/2019 | | |
| CN | 110546636 | 12/2019 | | |
| CN | 110704368 | 1/2020 | | |
| CN | 110738567 | 1/2020 | | |
| CN | 110750329 | 2/2020 | | |
| CN | 111090875 | 5/2020 | | |
| CN | 111538521 | 8/2020 | | |
| CN | 111563253 | 8/2020 | | |
| EP | 3477569 | 5/2019 | | |
| WO | WO-2020150741 A1 * | 7/2020 | ........... | H04L 9/3239 |

OTHER PUBLICATIONS

Crosby et al., "BlockChain Technology: Beyond Bitcoin," Sutardja Center for Entrepreneurship & Technology Technical Report, Oct. 16, 2015, 35 pages.
medium.com [online], "Ontology Wasm-JIT Released: A Leading Smart Contract Virtual Machine with High Speed and Performance," Mar. 12, 2020, retrieved on Jul. 7, 2021, retrieved from URL <https://medium.com/ontologynetwork/ontology-wasm-jit-released-a-leading-smart-contract-virtual-machine-with-high-speed-and-519783fe5055>, 4 pages.
Nakamoto, "Bitcoin: A Peer-to-Peer Electronic Cash System," www.bitcoin.org, 2005, 9 pages.
EP Extended Search Report in European Application No. 21182400.8, dated Dec. 17, 2021, 12 pages.
Dong et al, "Celer Network: Bring Internet Scale to Every Blockchain", arXiv, Sep. 28, 2018, 56 pages.
Knecht et al, "Mandala: A Smart Contract Programming Language", arXiv, Nov. 26, 2019, 19 pages.

* cited by examiner

METHODS, BLOCKCHAIN NODES AND STORAGE MEDIA FOR DEPLOYING SMART CONTRACT

CROSS-REFERENCE TO RELATED APPLICATIONS

This application claims priority to Chinese Patent Application No. 202010901437.8, filed on Aug. 31, 2020, which is hereby incorporated by reference in its entirety.

TECHNICAL FIELD

One or more embodiments of the present specification relate to the field of blockchain technology, and in particular to methods, blockchain nodes and storage media for deploying smart contract.

BACKGROUND

Blockchain is a new application mode of computer technology such as distributed data storage, point-to-point transmission, consensus mechanism, and encryption algorithm. In blockchain 2.0 era, smart contracts are introduced so that the scope of application of blockchain is raised to a new level. With the smart contacts, what the blockchain can do is not only making a single money-transfer transaction, but also invoking a piece of code which is user customizable.

SUMMARY

Present specification is to provide methods, blockchain nodes and storage media for deploying smart contract.

The methods, blockchain nodes and storage media for deploying smart contract, provided by embodiments of present specification are implemented as follows:

A method for deploying a smart contract, comprising:

sending, by a client device, a bytecode of the smart contract to a first trusted execution environment TEE, and receiving a machine code obtained by Ahead of Time (AoT) compilation of the bytecode by the first TEE;

receiving, by a blockchain node, a transaction for creating the smart contract submitted by the client device, where the transaction includes the machine code of the smart contract; and completing, by the blockchain node, a deployment of the smart contract when it is determined that the machine code is obtained by compiling the bytecode by a trusted TEE.

A method for deploying a smart contract, comprising:

receiving, by a blockchain node, a transaction for creating a smart contract, the transaction includes a machine code of the smart contract, where the machine code is obtained by AoT compilation of a bytecode of the smart contract by a first trusted execution environment TEE; and completing, by the blockchain node, a deployment of the smart contract when it is determined that the machine code is obtained by compiling the bytecode by a trusted TEE.

A blockchain node for deploying a smart contract, wherein the method described above is performed.

A blockchain node for deploying a smart contract, comprising:

a processor, and a memory storing a program thereon, wherein when the processor executes the program, the methods described above are performed.

A storage medium for storing a program, wherein when the program is executed, an operation of the methods described above are performed.

With the above-mentioned embodiments of present specification, before deploying the smart contract to the blockchain, the client device sends the bytecode of the smart contract to the first TEE for AoT compilation into the corresponding machine code, so that the machine code of the smart contract is directly deployed on the blockchain, thus when the smart contract is invoked, it can run efficiently based on the deployed machine code. Because of the characteristics of the machine code itself, the machine code can perform far more operations than the bytecode, which will also bring more risks, such as the leakage of the private data stored at the blockchain node and affecting the stable operation of the blockchain nodes, etc. Therefore, for transaction that creates smart contract, by restricting the TEE used to compile and generate machine code, and endorsing the security of the machine code by the trusted TEE, the machine code generated by untrusted TEE compilation can be prevented from being deployed on the chain, thus reduce or eliminate the previously described risks.

DESCRIPTION OF THE EMBODIMENTS

Figure 1:
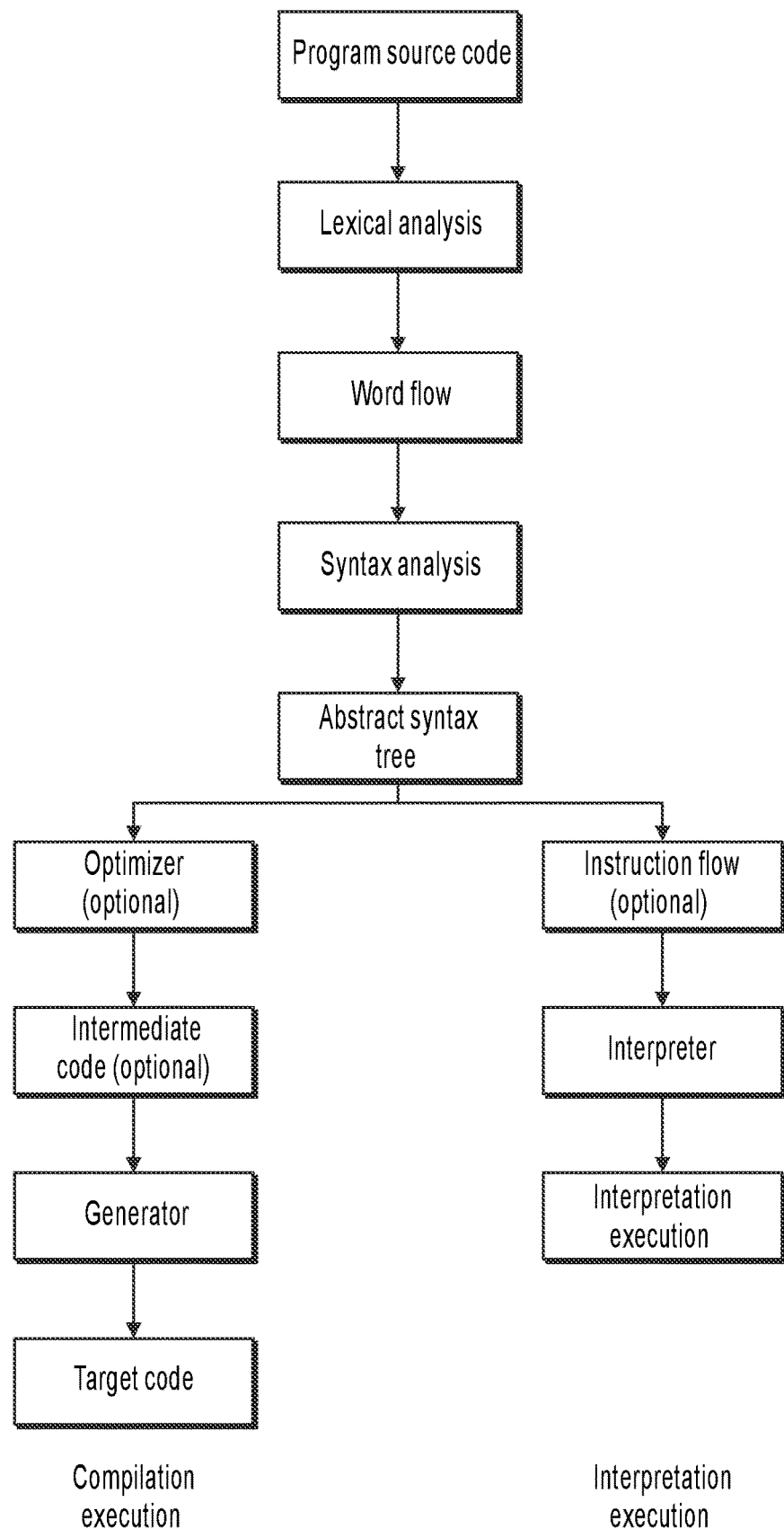
FIG. 1 is a schematic diagram of the principle of compilation execution and interpretation execution in an embodiment.

The explanatory embodiments are described in detail herein, and are illustratively shown in the drawings. When the following description refers to the drawings, unless otherwise indicated, the same numbers in different drawings indicate the same or similar elements. The embodiments described in the following explanatory embodiments do not represent all embodiments consistent with one or more embodiments of the present specification. On the contrary, they are merely examples of apparatuses and methods consistent with some aspects of one or more embodiments of the present specification and described in detail in the appended claims.

It should be noted that, in other embodiments, the steps of corresponding methods are not necessarily performed based on a sequence shown and described in this specification. In some other embodiments, the methods can include more or fewer steps than those described in this specification. Moreover, a single step described in the present specification can be divided into a plurality of steps for description in other embodiments; and a plurality of steps described in the present specification can be combined into a single step for description in other embodiments.

The Blockchain 1.0 era usually refers to the development stage of blockchain applications represented by the bitcoin between 2009 and 2014, and mainly focuses on solving the problem of decentralization of currency and payment means. Since 2014, developers have paid more and more attention to solving deficiencies of bitcoin in terms of technology and scalability. In late 2013, Vitalik Buterin released an Ethereum white paper, "Ethereum: A next-generation smart contract and decentralized application platform", which introduced smart contracts into the blockchain and started the application of the blockchain outside the monetary field, thus started the era of Blockchain 2.0.

A smart contract is a computerized protocol that can automatically execute based on specified trigger rules, and can also be regarded as a digital version of a traditional contract. The concept of the smart contract is first proposed in 1994 by Nick Szabo, an interdisciplinary legal scholar and cryptography researcher. This technology was once not used in the practical industry due to the lack of programmable digital systems and related technology, until the emergence of blockchain technology and Ethereum which provided a secure execution environment. Due to a blockchain-type ledger adopted by the blockchain technology, generated data cannot be tampered with or deleted, and the entire ledger will continuously add ledger data, thus ensuring traceability of historical data; moreover, the decentralized operation mechanism avoids the influence of centralized factors. Smart contracts based on the blockchain technology can not only give full play to advantages of the smart contracts in terms of cost and efficiency, but also avoid interference of malicious acts on normal execution of contracts. The smart contract is written into the blockchain in a digital form, and the characteristics of the blockchain technology ensure that the whole process of storage, reading and execution is transparent, traceable and cannot be tampered with.

The smart contract is essentially a program that can be executed by a computer. Like computer programs widely used now, smart contracts can be written in high-level languages (such as C language, C++ language, etc.). A program code of a smart contract written in high-level languages can generally be converted into "a machine code" that can be recognized and run by a Central Processing Unit (CPU) of the computer through a "compiler", and then such machine code (or "microprocessor instruction") can be executed by the CPU. This mode is generally called "compilation execution".

The compilation execution is generally not scalable across platforms. Because there are different manufacturers, different brands and different generations of CPUs, instruction sets supported by these different CPUs in many cases are different, such as x86 instruction set, ARM instruction set, etc., and the instruction sets supported by CPUs of different generations but the same manufacturer and the same brand (such as different generations of Intel CPUs) are not exactly the same. Therefore, the same program code written in the same high-level language may be converted into different machine codes by compilers on different CPUs. Specifically, in a process of converting a program code written in high-level languages into a machine code, a compiler will optimize in combination with the characteristics of specific CPU instruction sets (such as vector instruction sets, etc.) to improve the speed of program execution, and such optimization is often related to specific CPU hardware. In this way, the same machine code can be run on x86, but may not be able to run on ARM; even for the same x86 platform, with the passage of time, the instruction set is constantly enriched and extended, which leads to that machine codes run on different generations of x86 platforms are different. Moreover, because the execution of a machine code needs the CPU to be scheduled by an operating system kernel, even with the same hardware, the machine codes supported to be run under different operating systems may be different.

Different from the compilation execution, there is also a program operation mode of "interpretation execution". For example, the Java language compiles a Java source code into a standard bytecode through a Java compiler, where the compiler is not aimed at an instruction set of any actual hardware processor, but defines a set of abstract standard instruction sets. The compiled standard bytecode generally cannot be run directly on a hardware CPU, so a virtual machine, namely Java Virtual Machine (JVM), is introduced, which runs on a specific hardware processor to interpret and execute the compiled standard bytecode.

JVM is the abbreviation of Java Virtual Machine, which is a kind of fictional computer, and usually can be realized by simulating various computer functions on actual computers. JVM shields information related to specific hardware platforms, operating systems, etc., so that Java programs can be run on a plurality of platforms without modification only by generating a standard bytecode that can be run on Java virtual machines.

A very important feature of the Java language is platform irrelevance. And using the Java virtual machines is the key to realize this feature. If a general high-level language is to be run on different platforms, the high-level language at least needs to be compiled into different target codes. After the introduction of the Java language virtual machine, the Java language does not need to be recompiled when it is to be run on different platforms. The Java language shields information related to specific platforms by using the Java virtual machine, so that a Java language compilation program can be run on various platforms without modification only by generating a target code (a bytecode) run on the Java virtual machine. When the Java virtual machine executes the bytecode, the Java virtual machine interprets the bytecode as a machine instruction on a specific platform to execute. This is why Java can be written once and run anywhere.

JVM runs on a specific hardware processor and is responsible for interpreting and executing a bytecode for the specific processor the JVM runs, shielding these underlying differences upward and presenting to developers with standard development specifications. When the JVM executes a bytecode, the JVM actually finally interprets the bytecode as a machine instruction on a specific platform to execute. Specifically, after receiving an input bytecode, the JVM interprets each instruction in the bytecode statement by statement and translates the instruction into a machine code suitable for the current machine to run. These processes are interpreted and executed by an interpreter, such as Interpreter. In this way, developers who write Java programs do not need to consider which kind of hardware platform the written program code will be run on. The development of the JVM is accomplished by professional developers in Java organization to adapt the JVM to different processor architectures. Up to now, there are only a limited number of mainstream processor architectures, such as X86, Advanced RIST (reduced instruction set computer) Machine (ARM), RISC-V, and Merit-based Incentive Payment System (MIPS). After professional developers respectively port the JVM to platforms that support the specific hardware, Java programs can theoretically be run on all machines. The migration of the JVM is usually provided by professionals in Java development organization, which greatly reduces the burden on Java application developers.

The interpretation execution brings cross-platform portability, but because the execution of a bytecode goes through the process of JVM intermediate translation, the execution efficiency is not as high as the above-mentioned compilation execution efficiency, and the difference in efficiency can sometimes even reach dozens of times.

FIG. 1 shows similarities and differences between compilation execution and interpretation execution. For both interpretation execution and compilation execution, or both a physical machine and a virtual machine, it is impossible for a machine to read and understand an application program like a human, and then acquire the ability to execute. Most of program codes, before becoming into the target code of the physical machine or an instruction set which can be executed by the virtual machine, are needed to go through all the steps in FIG. 1. In FIG. 1, the branch from the top to the left is a generation process from a program code to a target machine code in traditional compilation principle, and the branch from the top to the right is a process of interpretation execution. Nowadays, most languages based on physical machines, Java virtual machines, or other High-Level Language Virtual Machines (HLLVMs) that are not Java will follow this idea based on modern classical compilation principles. Before execution, the program source code is processed with lexical analysis and syntax analysis first to convert the source code into an Abstract Syntax Tree (AST). For the implementation of a specific language, lexical analysis, syntax analysis and even the following optimizer and target code generator can be selected to be independent of an execution engine to form a complete compiler to implement, which is represented by C or C++ language. Or, some of these steps (such as those steps before generating the AST) can be chosen to implement as a semi-independent compiler, which is represented by Java language. Or all these steps and the execution engine are concentrated encapsulated in a closed black box, such as most JavaScript executors.

In order to balance cross-platform portability and high performance as much as possible, the concept of Just-In-Time Compiler (JIT) was proposed. The core idea of the JIT is "how to efficiently avoid repetitive work of interpreting instructions". There are a large number of repeatedly executed codes in computer programs. For example, some computing "functions" may be invoked many times by a loop during the execution of a program. If it is interpretation execution, each execution of the loop process will translate this function from a bytecode to a machine code. However, the actual situation is that the machine code generated by this function in dozens of translations is exactly the same. Naturally, if after the first translation, the machine code of the translated function is cached, and in the subsequent re-execution process, the cached code is directly used instead of re-translation, the execution efficiency can be improved.

On the contrary, some functions are executed only once during a program running cycle (for example, boot initialization), then such functions do not need to be cached and can be directly interpretation executed once. Therefore, a core module in JIT technology is "hotspot analysis", that is, analyze which codes are executed many times in the process of program execution, so as to cache translated machine code of the codes. For operations with less number of executions, caching is not needed. In this way, a best balance between execution efficiency and memory overhead can be achieved.

In addition, another core module in the JIT technology is compilation optimization (or optimized compilation). Directly translated machine codes are not optimized in conjunction with the context, but only cashes high-frequency machine codes, which is limited in performance improvement. For better performance, further optimizations can be made to a compiler. The way of compilation optimization generally takes relatively more time to implement.

Figure 2:
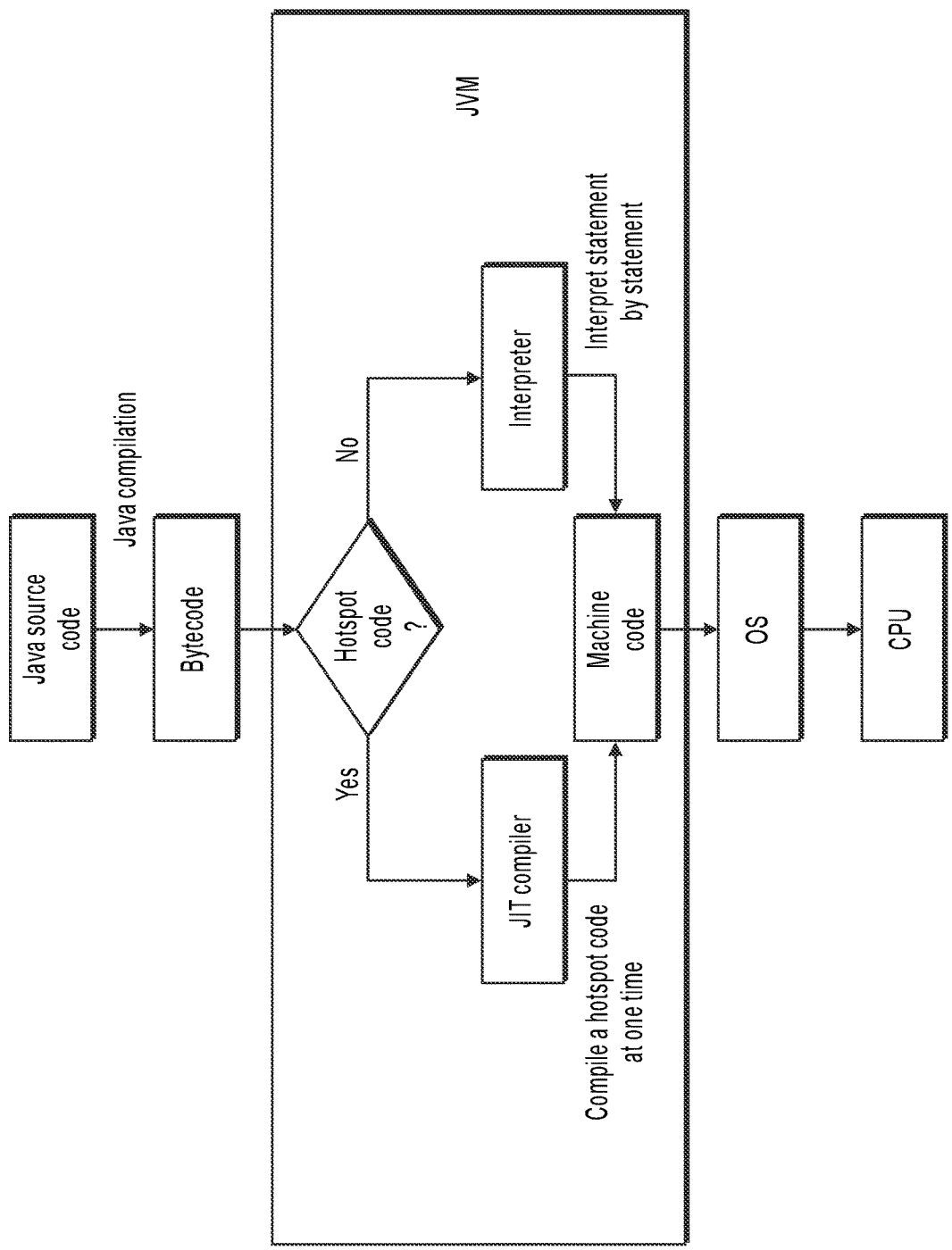
FIG. 2 is a schematic diagram of the principle of explanation execution and Just-In-Time (JIT) in an embodiment.

The working principle of the JIT is, for example, shown in FIG. 2. A Java source code is compiled by a Java compiler to generate a piece of Java bytecode, which is distributed to two execution paths (JIT Compiler and Interpreter) after hotspot analysis. A code determined as a hotspot (high frequency execution) is compiled in a JIT compiler to obtain a machine code, the machine code is cached and executed, which is generally executed by a CPU under the control of an Operating System (OS). A code with low frequency accesses the Interpreter, where the code is translated into a machine code and then executed by the CPU under the control of the OS.

Due to the correlation of backward and forward of the program code, there is often a large space for optimization in the compilation process. The execution efficiency of optimized machine code will be much higher than that of directly translated machine code. If better performance is to be obtained, optimization of a compiler is necessary. The compilation process of the JIT Compiler may be time consuming. In particular, the JIT Compiler may take a long time to compile the bytecode for the first time, which is even worse than the interpretation execution. Then, for some java programs, if the hotspots are not very prominent, i.e., none of respective execution frequencies is very high, while the overall execution flow is long, it is difficult for the JIT to take advantage of the compilation execution.

In addition, another idea is put forward, that is, AoT (Ahead of Time). AoT is equivalent to a pre-compiled execution way. Before a program is run, a bytecode is compiled once for a target execution environment to obtain a machine code, which is then deployed to a target machine for execution. AoT can run as efficiently as compilation execution. During the AoT, it is necessary to clearly know the hardware, the instruction set architecture and the system, etc. of a target system to ensure that the compiled code can be run. Furthermore, generally speaking, for instructions with the same function, the amount of statements needed to express in a machine code is greater than in a bytecode, and much greater than in a code written in a high-level language, in this way, for a program with the same content, it is likely that a size of the machine code>a size of the bytecode>a size of the high-level language code. The bytecode can be compiled into a machine code by AoT, in a case that the hardware, the instruction set architecture and the system, etc. of the target system are clearly known. Moreover, the machine codes for different classes of target systems are different, so it may be necessary to provide different versions of machine codes so that there can be corresponding correctly executed machine codes on the various target systems. In this way, a total size of the machine code will generally be larger than that of the bytecode or the high-level language code.

For example, Android uses the Dalvik virtual machine before version 5.0, and uses the ANDROID Runtime (ART) virtual machine after the version 5.0. The Dalvik uses a JIT compiler to interpret a bytecode, while the ART uses an AoT mechanism. The ART manner pre-compiles a bytecode (the installation process of an Android App is actually installing the bytecode of a program) to a machine code at the time of installing an application. After removing the process of interpreting code, applications on the Android can be executed more efficiently and started faster.

As a decentralized distributed system, the blockchain needs to maintain distributed consistency. Specifically, for a set of nodes in a distributed system, each node has a built-in state machine. Each state machine needs to execute the same instructions in the same order from the same initial state, and keep each change of state the same, thus ensuring that a consistent state is eventually reached. However, it is difficult for all node devices participating in the same blockchain network to have the same hardware configuration and software environment. Therefore, in Ethereum which is the representative of Blockchain 2.0, a virtual machine similar to the JVM, the Ethereum Virtual Machine (EVM), is used in order to ensure that the process and result of executing smart contracts are the same on each node. The differences in hardware configuration and software environment of each node can be shielded with the EVM. In this way, a developer can develop a set of code for a smart contract and upload the compiled bytecode to the blockchain after the code of the smart contract is compiled locally by the developer. When each node interprets and executes the same bytecode through the same EVM with the same initial state, the node can obtain the same final result and the same intermediate result, and can shield the differences of underlying hardware and environmental differences between different nodes. In this way, the emergence of decentralized blockchain technology enables the implementation of the smart contracts proposed as early as 1994, and, because the implementation of decentralization inevitably faces differences in the hardware and operating environment of different execution machines, furthermore, the smart contracts are processed in a way of interpretation execution to ensure that the same execution results can be obtained on decentralized machines with different hardware and operating environment.

The EVM is a Turing complete virtual machine, which means that various complex logics can be implemented through the EVM. This is also one of the biggest improvements of the Ethereum as a representative of the Blockchain 2.0 over the Blockchain 1.0. A smart contract that the users publish or invoke in the Ethereum can be run on the EVM. As mentioned earlier, the EVM directly runs a bytecode, and smart contracts deployed on the blockchain can be in a form of the bytecode.

Figure 3:
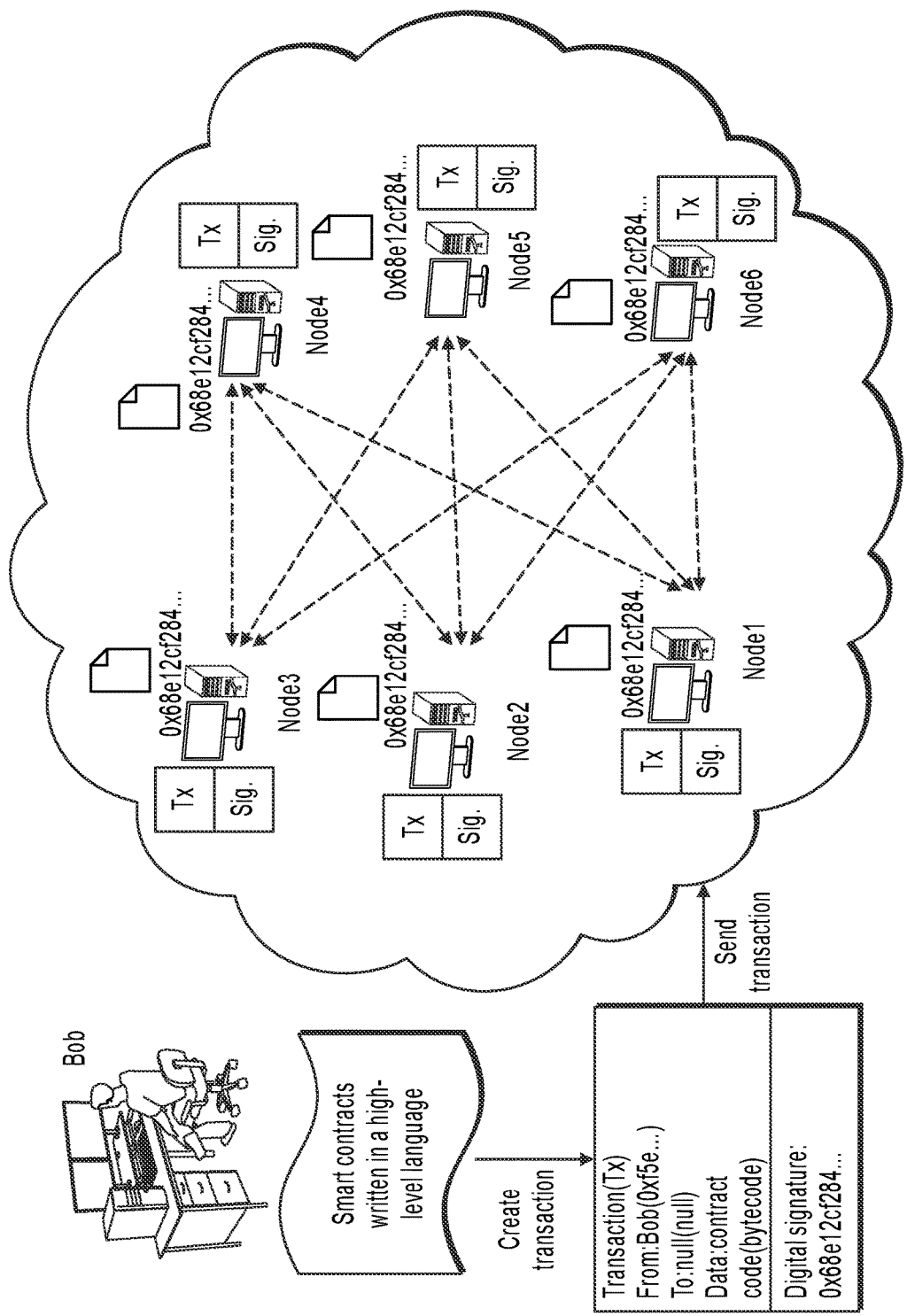
FIG. 3 is a diagrammatic process of creating a smart contract in an embodiment.

For example, as shown in FIG. 3, after Bob sends a transaction containing information about the creation of a smart contract to the Ethereum network, an EVM of node 1 can execute the transaction and generate a corresponding contract instance. The "data" field of the transaction can hold a bytecode, and the "to" field of the transaction can be a null address. Once the nodes reach an agreement through a consensus mechanism, the contract is successfully created and can be invoked by users subsequently.

When the contract is created, a contract account corresponding to the smart contract appears on the blockchain, which has a specific address, and a contract code and an account storage can be stored in the contract account. The behavior of the smart contract is controlled by the contract code, while the account storage of the smart contract holds a state of the contract. In other words, the smart contract enables the creation of a virtual account containing the contract code and the account storage on the blockchain.

As mentioned above, the "data" field which includes the transaction for creating a smart contract can hold a bytecode of the smart contract. The bytecode includes a sequence of bytes, and each of which can indicate an operation. Instead of writing the bytecode directly, developers can choose a high-level language to write a smart contract code, based on various considerations such as development efficiency and readability, etc. The smart contract code written in the high-level language is compiled by a compiler to generate a bytecode, and then the bytecode can be deployed on the blockchain. There are many high-level languages supported by the Ethereum, such as Solidity, Serpent, Lisp Like Language (LLL), etc.

Taking the Solidity language as an example, a contract written in the Solidity language is very similar to a Class in the object-oriented programming language, and a variety of members can be declared in one contract, including state variables, functions, function modifiers, events, etc. The state variables are values permanently stored in the account storage of the smart contract and are used to save the state of the contract.

The following is a code example 1 of a simple smart contract written in the Solidity language:

```
Contract Example {
    int balance;
    function C( ) {
        balance + = 1;
    }
    function getbalance( ) returns(int){
        return balance ;
    }
}
```

Generally, when the contract is deployed on the blockchain, the state variable "balance" can be a kind of asset type newly defined in the contract. The function CO can define a change operation of the "balance", and the function getbalance( ) returns(int) can define an operation that gets the current value of the "balance" and returns.

Figure 4:
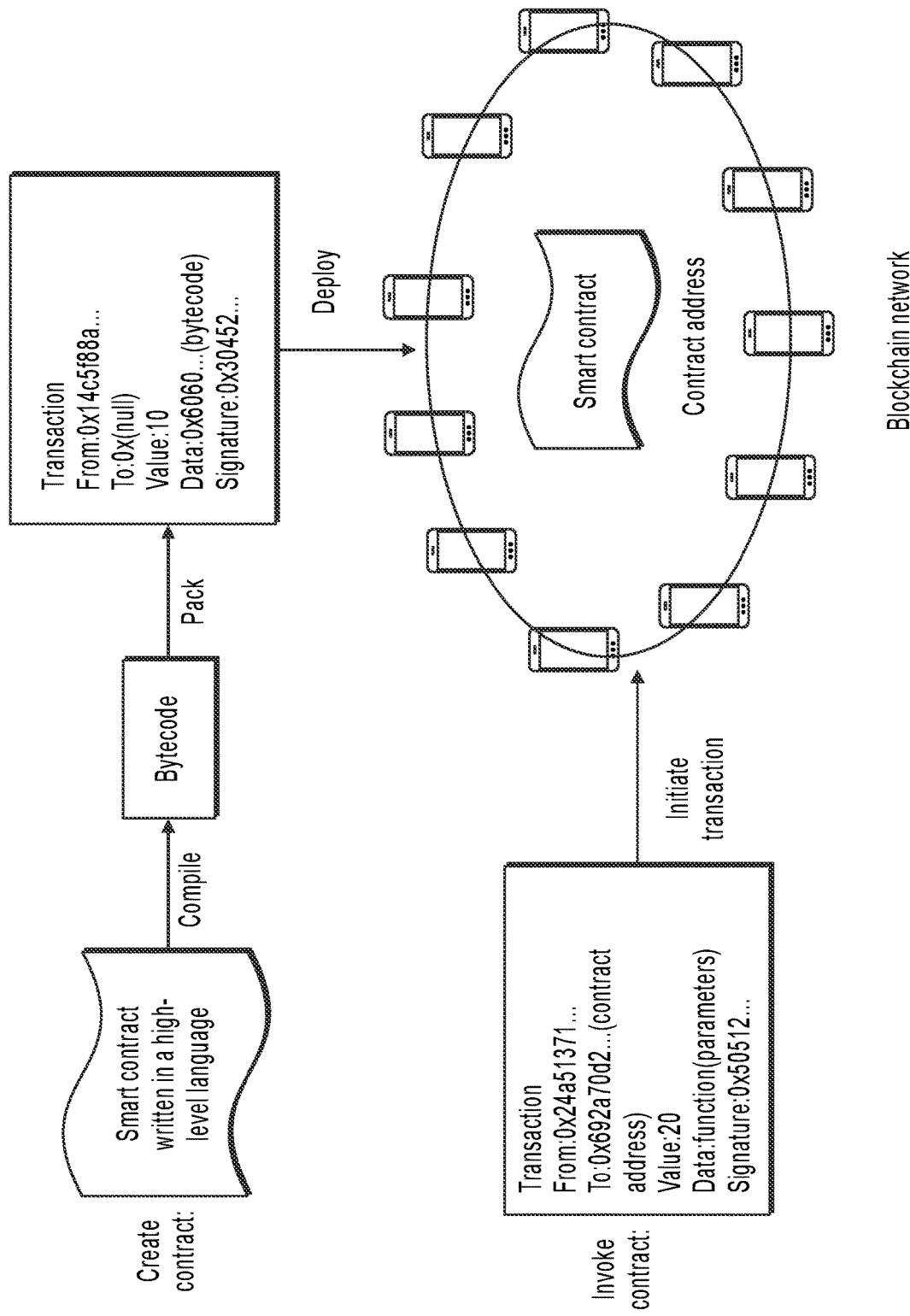
FIG. 4 is a diagrammatic process of invoking a smart contract in an embodiment.

Furthermore, as shown in FIG. 4, still using the Ethereum as an example, after Bob sends a transaction containing information about invoking a smart contract to the Ethereum network, the EVM of node 1 can execute the transaction and generate a corresponding contract instance. In FIG. 4, the "from" field of the transaction indicates the address of the account that initiated the invoking of the smart contract, the "0x692a70d2 . . . " in the "to" field represents the address of the smart contract being invoked, the "value" field indicates the value of Ethers in the Ethereum, and the "data" field of the transaction holds methods and parameters for invoking the smart contract. The value of the "balance" may change when the smart contract is invoked. Subsequently, a client device can view the current value of the "balance" via a blockchain node.

Smart contracts can be executed independently at each node in the blockchain network in a predetermined manner, with all execution records and data stored on the blockchain, so that when such a transaction is completed, a credential of the transaction that cannot be tampered with and will not be lost is stored on the blockchain.

Figure 5:
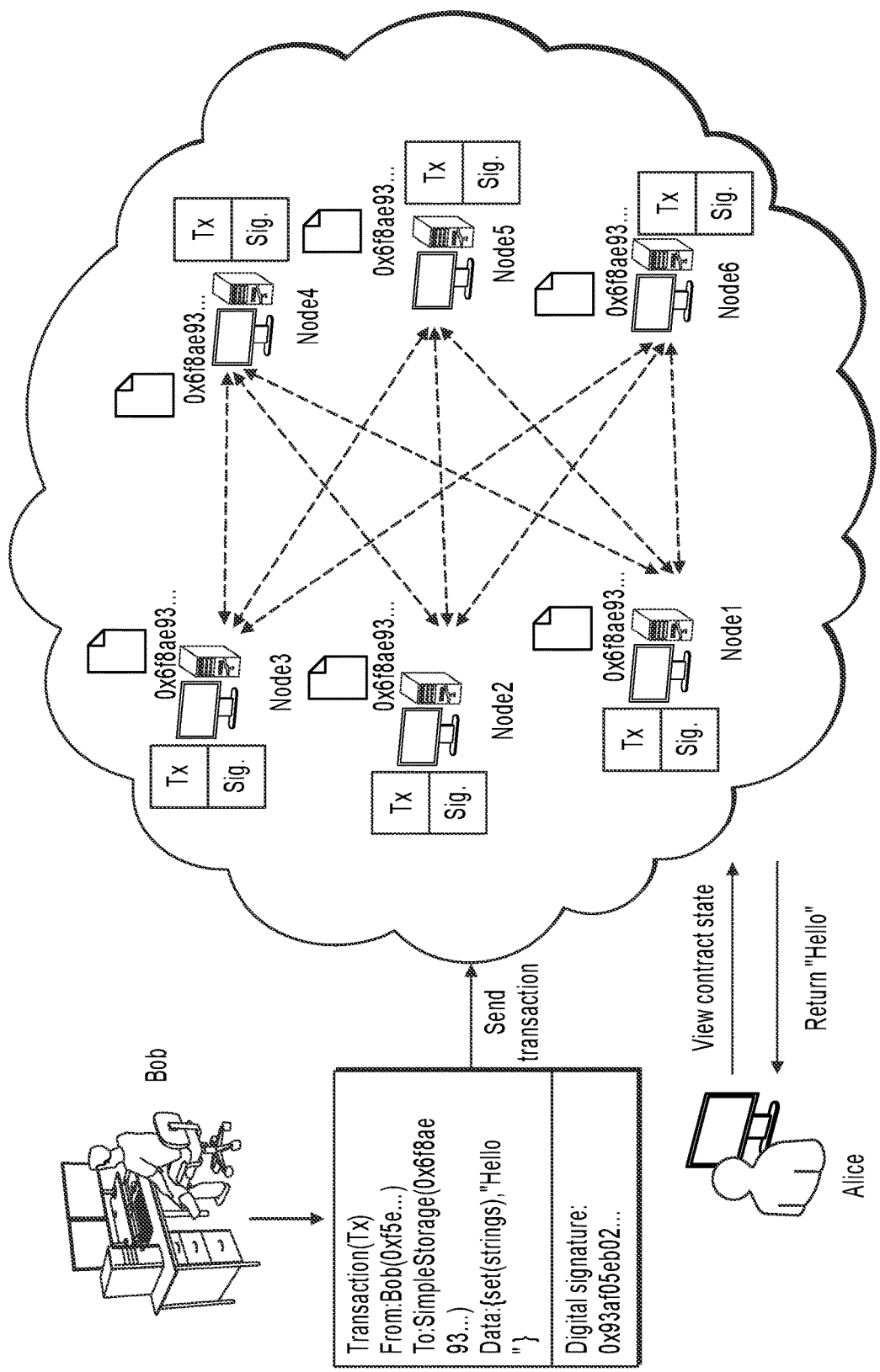
FIG. 5 is a schematic diagram of creating a smart contract and invoking a smart contract in an embodiment.

The diagram for creating a smart contract and invoking the smart contract is shown in FIG. 5. To create a smart contract in the Ethereum, the process of writing the smart contract, turning into a bytecode, and deploying to the blockchain, etc. needed to be gone through. Invoking a smart contract in the Ethereum indicates initiating a transaction that points to the address of the smart contract (the address of the smart contract can be pointed to via the "to" field in the transaction), and a smart contract code is run distributed in a virtual machine of each node in the Ethereum network.

Figure 9:
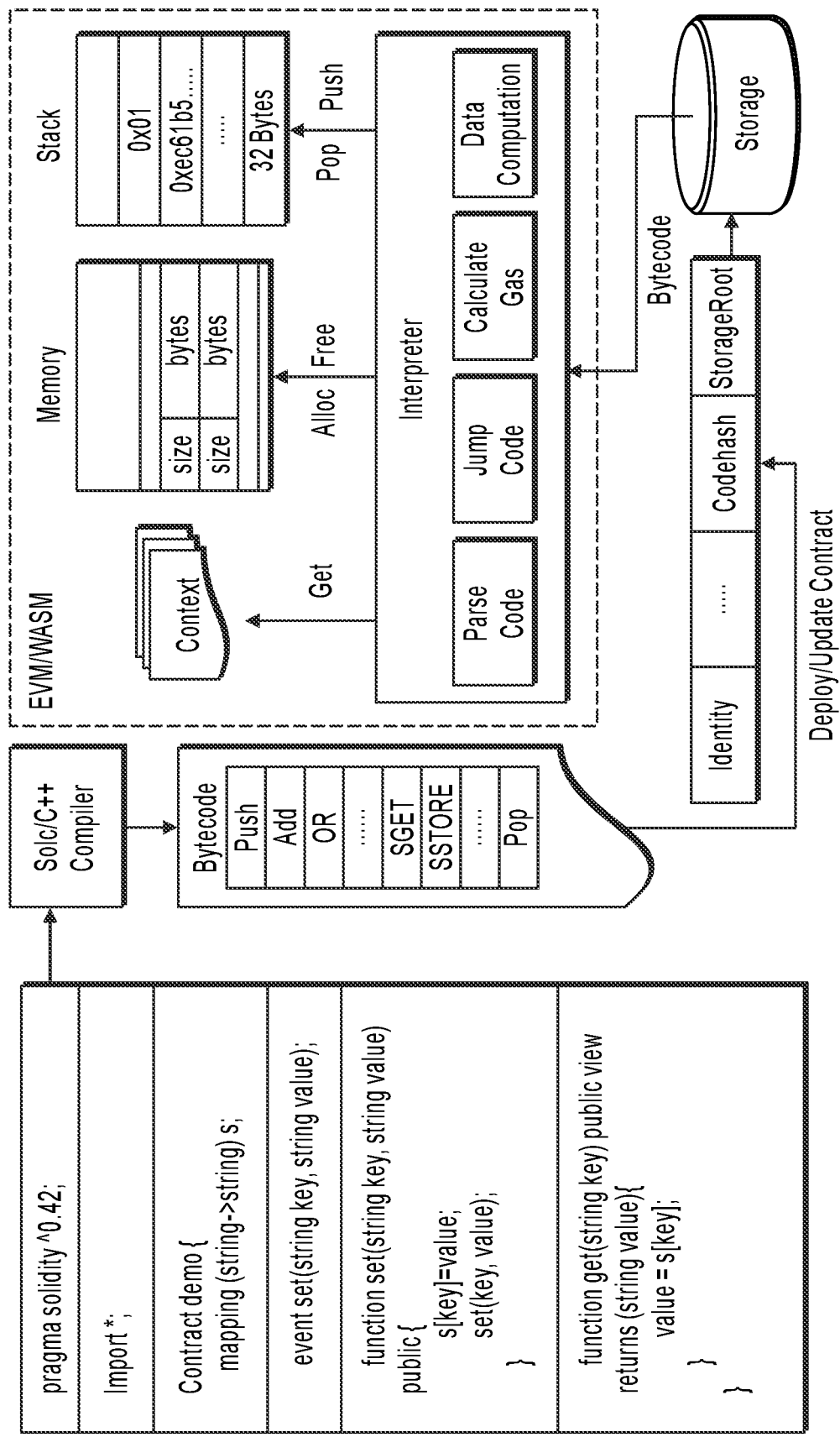
FIG. 9 is a schematic diagram of a process, which including a virtual machine execution process, of creating a smart contract and invoking a smart contract in an embodiment.

The transaction of creating the smart contract is sent to the blockchain network, and after consensus, each blockchain node can execute the transaction. Specifically, it could be the EVM or Web Assembly (WASM) of the blockchain node that performs this transaction. As mentioned earlier, at this time, a contract account corresponding to the smart contract (including, for example, an identity of the account Identity, hash value of the contract Codehash, and root of the contract StorageRoot) appears on the blockchain, the contract account has a specific address, and the contract code and the account storage can be held in the Storage of the contract account, as shown in FIG. 9. The behavior of the smart contract is controlled by the contract code, while the account storage of the smart contract holds the state of the contract. In other words, smart contracts enable virtual accounts containing a contract code and an account storage to be created on the blockchain. A Codehash value will be generated or changed for contract deployment transactions or contract update transactions. Subsequently, the blockchain node can receive a transaction request for invoking the deployed smart contract, which can include the address of the invoked contract, the function in the invoked contract, and input parameters. Generally, when the transaction request has past a consensus, each node of the blockchain can independently execute the smart contract designated for the invoking. Specifically, as shown in FIG. 9, the node can load a bytecode of the contract from the Storage into the virtual machine (EVM or WASM) based on the address of the contract; then, the bytecode is interpreted and executed by the Interpreter, which includes, for example, parsing the bytecode of the invoked contract to obtain OPcodes and storing these OPcodes in Memory of the virtual machine, at the same time the address of the invoked function can be obtained; when the amount of Gas needed to execute the contract is calculated and the Gas is enough, the corresponding address in the Memory is jumped to for obtaining the OPcode of the invoked function and starting to execute, and operations such as Data Computation and Push or Pop in Stack and the like are performed on the data operated by the OPcode of the invoked function, so as to complete the data computation. This process may also need some information about the Context of the contract, such as the block number, information of an initiator that invokes the contract, and the like, which can be got from the Context (Get operation). Finally, the generated state is stored in the Storage by invoking a storage interface. It should be noted that the process of creating a contract may generate interpretation execution of certain functions in the contract, such as functions for initialization operations, which will also parse codes, generate jump instructions, store in the Memory, operate data in the Stack, etc. In the above-mentioned interpretation execution process, generally speaking, functions that are repeatedly executed are not cached, and even for functions that are executed many times, the virtual machine needs to repeat the parsing and executing process as well.

Figure 8:
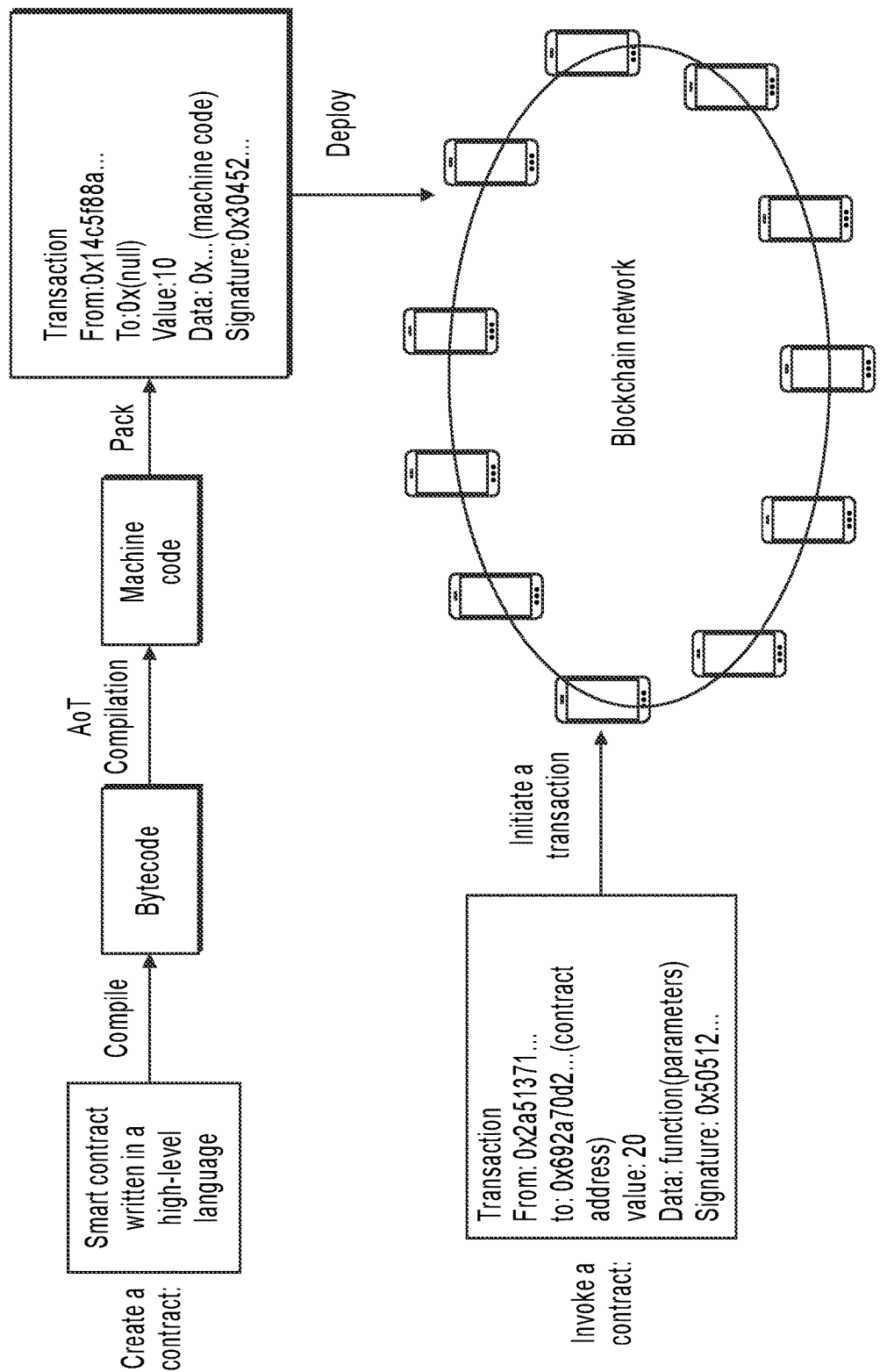
FIG. 8 is a schematic diagram of creating a smart contract and invoking a smart contract in another embodiment.

As mentioned earlier, the JVM has the advantages of cross-platform portability and the need to improve performance. Similarly, the EVM in the blockchain can also use technology such as the JIT and the AoT to improve the performance of executing a smart contract. For example, before the smart contract is deployed on the blockchain, AoT compilation is performed, and the machine code obtained after the compilation is uploaded to the chain to complete the deployment of the contract, such as the process shown in FIG. 8. The deployed contract can have a specific address on the blockchain. In this way, the contract's machine code can be included in the contract creation transaction initiated by the client device. For example, after the client device compiles a smart contract written in a high-level language into bytecode, AoT compilation is performed locally on the client device to obtain machine code. The process of executing the contract on the chain (or the process of invoking the smart contract), for example, can be a client device (which can be different from the client device that creates the smart contract) directly invoking the machine code on the chain compiled by AoT and executing it. Here, in the transaction of invoking the contract, the generally pointed address (that is, the address pointed to by the to field) can be the address of the invoked contract. Because the AoT compilation in this example is completed before the smart contract is on-chain, it can be referred to as "off-chain AoT" for short. The off-chain AoT compilation process can perform a lot of code optimization, so that the efficiency of contract execution on the chain can be greatly improved. But the shortcomings are also obvious, that is, the processor architecture and operating environment of the deployed target node need to be obtained in advance in the case of off-chain AoT, otherwise the machine code on the chain cannot be executed on the target node in the future. At the same time, in order to adapt to various target nodes, AoT may need to be compiled into a variety of different machine codes. In this way, the size of the machine code compiled by AoT will be much larger than the size of the original smart contract bytecode, increasing the amount of data on the chain and increasing storage overhead.

Figure 6:
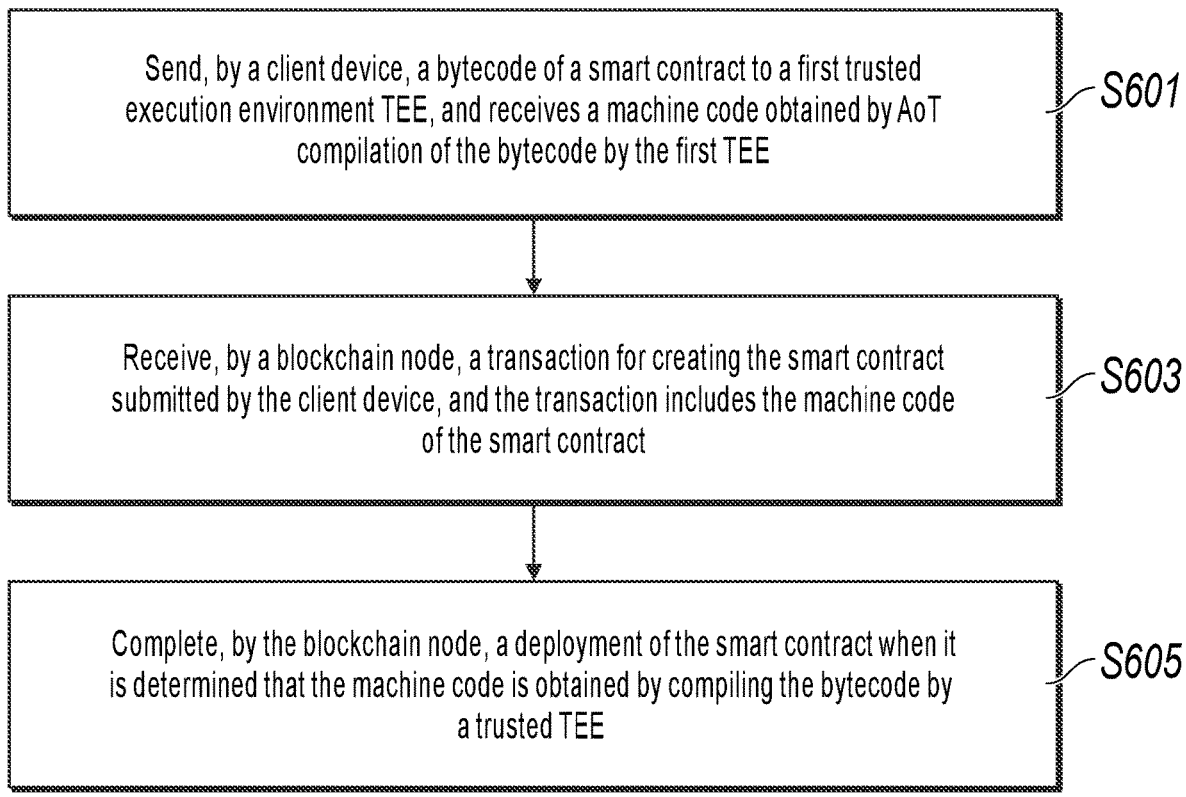
FIG. 6 is a flowchart of deploying a smart contract in an embodiment.

Present specification provides an embodiment of a method for executing a smart contract, as shown in FIG. 6, including:

S601: The client device sends the bytecode of the smart contract to the first trusted execution environment TEE, and receives the machine code obtained by AoT compilation of the bytecode by the first TEE.

S603: The blockchain node receives a transaction for creating the smart contract submitted by the client device, and the transaction includes the machine code of the smart contract.

Users can write smart contract in high-level languages. The written smart contract can be compiled by a compiler adapted to the high-level language to obtain bytecode. Furthermore, the user can compile the bytecode of the smart contract into machine code through the first TEE (Trusted Execution Environment), and then package the machine code of the smart contract into the transaction through the client device and send it to the blockchain network. The format of the transaction is, for example, as shown in FIGS. 3 to 5, where the machine code of the smart contract to be created can be stored in the data field of the transaction.

The main body of the first TEE deployment can have many situations. For example, the first TEE can be deployed on the client device itself. After the client device compiles the bytecode of the smart contract into machine code in the first TEE, the machine code of the smart contract is packaged into the transaction and sent to the blockchain network. For another example, the first TEE can be deployed on a certain blockchain node, for example, it can be the blockchain node that receives the transaction in above-mentioned step S603, or any other blockchain node in the blockchain network. When the first TEE is deployed on a blockchain node, the user can send the bytecode of the smart contract to the blockchain node through the off-chain channel, and after the bytecode of the smart contract be compiled into machine code by the blockchain node in the first TEE, it will be returned to the user; or, the user can create a transaction that invokes the smart contract on the client device, and include the bytecode of the smart contract in the data field of the transaction, the transaction invokes the smart contract deployed on the blockchain and used to implement the compilation function, so that the contract code of the smart contract is run in the first TEE to compile the bytecode into the corresponding machine code, and the client device can obtain the transaction receipt from the blockchain node, and the transaction receipt can include the machine code generated by the compilation. For another example, the above-mentioned compilation server can be a third-party server different from the client device and the blockchain node. The third-party server is used to provide compilation services to the outside. Then the user can send the bytecode of the smart contract to the third-party server, enables the third-party server to compile the bytecode of the smart contract into machine code in the first TEE. The third-party server can be a shared service platform that provides compilation services to all or at least some users. For example, the shared service platform can be deployed on a cloud server or in other forms, and present specification does not limit this.

When compiling the bytecode of the smart contract into machine code, the bytecode of the smart contract can be compiled into machine code through AoT. AoT compilation technology can improve the performance of smart contract execution. Specifically, it can be compiled in conjunction with the correlation of the program code, and the optimized and compiled machine code can be obtained. The execution efficiency of compiled and optimized machine code is generally higher than that of directly translated machine code. On the one hand, by providing the hardware and environment information of the blockchain node to the AoT engine, the compiled machine code has hardware+environment optimization, which can specifically include optimization in machine code generation, including instruction-level optimization, register allocation and optimization and so on. On the other hand, the AoT engine can analyze context information, such as the branch jump statement executed in the current function, and identify which sentence is the most likely to jump, so as to adjust the most likely jump to the front, so that it can hit the sentence of this branch first with a higher probability during execution; the compiler optimization process can also eliminate dead code through data flow analysis and/or active variable analysis, such as eliminating branches that will not be reached, and also including optimization for loop statements, common words expression replacement, etc.

S605: The blockchain node completes the deployment of the smart contract when it is determined that the machine code is obtained by compiling the bytecode by a trusted TEE.

Compared with bytecode, machine code can perform much more operations, so the threat to the chain is relatively greater. For example, by tampering with the machine code of the smart contract, after the smart contract is invoked, the machine code can be run to read the private data stored on the blockchain node, such as the private data stored in a trusted execution environment (TEE) deployed on the blockchain node, can even affect the normal operation of the blockchain nodes, and undermine the security and stability of the blockchain network. Therefore, when the transaction for creating a smart contract contains the bytecode of the smart contract, the blockchain node is not restricted; when the transaction for creating the smart contract contains the machine code of the smart contract, the blockchain node can limit the TEE which compiles and generates the machine code, so as to ensure that only the machine code compiled and generated in the trusted TEE can be deployed on the blockchain.

The blockchain node can determine whether the TEE is a trusted TEE based on the signature generated in the first TEE. The blockchain node can obtain the machine code signature of the first TEE. After the first TEE compiles the bytecode into the machine code, the signature is generated by the private key maintained in the first TEE; accordingly, when the signature is successfully verified by a public key corresponding to the predefined trusted TEE mirror image, the blockchain node can determine that the first TEE is created by a trusted TEE mirror image. Then the compiled and generated machine code can be endorsed by the credibility of the trusted TEE mirror image, to determine that the first TEE is a trusted TEE and the machine code does not have security issues. Blockchain nodes can use the public key corresponding to the trusted TEE mirror image to verify the signature of the machine code by running the chain code. If the signature of the machine code is successfully verified by the public key corresponding to the trusted TEE mirror image, the blockchain node can determine that the first TEE is created by a trusted TEE mirror image. Or, the public key corresponding to the trusted TEE mirror image is recorded in the system contract, and the blockchain node can invoke the system contract and pass the signature contained in the transaction to the system contract, so that the contract code of the system contract is executed to verify the signature by the public key corresponding to the trusted TEE mirror image, and then the blockchain node receives the identification result returned by the system contract. The identification result is used to indicate whether the signature is successfully verified by the public key corresponding to the trusted TEE mirror image.

TEE is a trusted execution environment based on a safe extension of CPU hardware and completely isolated from the outside. TEE was first proposed by Global Platform to solve the security isolation of resources on mobile devices, and parallel to the operating system to provide a trusted and secure execution environment for applications. ARM's Trust Zone technology is the first to realize the real commercial TEE technology. With the rapid development of the Internet, the demand for security is getting higher and higher. Not only mobile devices, cloud devices, but also data centers have put forward more demands on TEE. The concept of TEE has also been rapidly developed and expanded. Compared with the original concept, the TEE referred to now is a TEE in a broader sense. For example, server chip manufacturers Intel, AMD, etc. have successively introduced hardware-assisted TEE and enriched the concept and characteristics of TEE, which has been widely recognized in the industry. The TEE mentioned now usually refers more to this kind of hardware-assisted TEE technology. Unlike the mobile terminal, cloud access needs remote access, and the end user is invisible to the hardware platform. Therefore, the first step in using TEE is to confirm the authenticity of TEE. Therefore, the current TEE technology has introduced a remote certification mechanism, which is endorsed by hardware manufacturers (mainly CPU manufacturers) and ensures that users can verify the state of the TEE by digital signature technology. At the same time, security needs that cannot be met by only secure resource isolation, further data privacy protection has also been proposed. Commercial TEEs including Intel Software Guard Extensions (SGX) and AMD Secure Encrypted Virtualization (SEV) also provide memory encryption technologies to limit trusted hardware to the inside of the CPU, and the data on the bus and memory are ciphertexts to prevent malicious users from snooping. For example, TEE technologies such as Intel's Software Guard Extensions (SGX) isolate code execution, remote attestation, secure configuration, secure storage of data, and trusted paths for code execution. The applications running in the TEE are protected by security and are almost impossible to be accessed by third parties.

Taking Intel SGX technology as an example, SGX provides an enclave, which is an encrypted trusted execution area in memory, where the data are protected by the CPU from being stolen. Taking the first blockchain node using a CPU that supports SGX as an example, using new processor instructions, a part of the area Enclave Page Cache (EPC) can be allocated in the memory, and through the encryption engine Memory Encryption Engine (MEE) in the CPU encrypts the data therein. The encrypted content in the EPC will only be decrypted into plaintext after it enters the CPU. Therefore, in SGX, users can distrust the operating system, Virtual Machine Monitor (VMM), and even Basic Input Output System (BIOS). They only need to trust the CPU to ensure that private data will not be leaked. In practical applications, the private data can be encrypted and transmitted to the enclave in cipher text, and the corresponding key (including the private key) can also be passed in the enclave through remote attestation. Then, use the data to perform operations under the encryption protection of the CPU, and the result will be returned in a form of cipher text. In this mode, powerful computing power can be used without worrying about data leakage.

If the first TEE is created based on a trusted TEE mirror image, the first TEE can obtain the private key distributed by the Key Management Server (KMS) after passing remote attestation, and the private key is maintained within the first TEE. For example, the first TEE can be an enclave generated based on SGX technology. Then, only when the compiler completes the compilation operation from bytecode to machine code in the TEE, will the machine code be signed based on the private key maintained within the TEE. Similarly, the blockchain node can obtain the public key corresponding to the trusted TEE mirror image from the KMS to ensure the reliability of the public key. Therefore, through the above-mentioned verification process, if the signature of the first TEE for the machine code is successfully verified by the public key corresponding to the trusted TEE mirror image, it indicates that the first TEE is indeed created based on the trusted TEE mirror image, and because the key must be maintained within the first TEE, it indicates that the machine code contained in the transaction is indeed compiled and generated in the first TEE, which ensures that the process of compiling bytecode to generate machine code is safe and reliable, and cannot be interfered by external factors, thus eliminate security risks and realize reliable endorsement of machine code security.

If the blockchain node identifies whether the first TEE is a trusted TEE by invoking the system contract, the blockchain node needs to invoke the system contract. In one case, the transaction for creating the smart contract can include the contract address of the system contract, so that the blockchain node can invoke the contract address during the execution of the transaction. In another case, the chain code of the blockchain node can include the contract address of the above-mentioned system contract and the invoking logic for the system contract. The triggering condition of the invoking logic can include: the blockchain node determines that the transaction type is a contract deployment type, for example, the to field of the contract deployment type transaction is empty. Then, when a blockchain node receives the contract deployment type transaction, it can automatically trigger the invoking of the above-mentioned system contract. And if the blockchain node only wants to restrict the deployment behavior of machine code type smart contract without restricting the deployment behavior of bytecode or other types of smart contract, then the trigger conditions for the above-mentioned invoking logic can also include: the contract deployment type transaction contains the machine code of the smart contract, so that the blockchain node will automatically trigger the invoking of the above-mentioned system contract only when the blockchain node receives a transaction that contains the machine code and is the contract deployment type.

A system contract is a special type of smart contract. For example, the system contract can be deployed in the genesis block. Or, although the system contract is deployed in a non-genesis block, the management authority of the system contract is the blockchain administrator, that is, the system contract is deployed by the blockchain administrator, and only the blockchain administrator can perform operations, such as version update, for the system contract, and different blockchain accounts can only invoke the system contract. Because the deployment operation of the machine code of the smart contract is involved, a system contract is usually used to ensure an accurate determination of whether the first TEE is a trusted TEE. Of course, even ordinary smart contract can also be used to implement the related functions implemented by the above-mentioned system contract, to determine whether the first TEE is a trusted TEE, and present specification does not limit this.

In Ethereum and similar public chains, consortium chains, or private chain systems, blockchain node can initiate consensus on a batch of transactions. The batch of transactions can include the above-mentioned transactions for creating smart contract. After the consensus is reached, generally, each consensus node stores the machine code of the smart contract to be created locally. Each consensus node can locally execute the transaction for creating smart contract and create a corresponding contract account; and create an address for the contract account based on the same rules, and the addresses created by each consensus node for the same contract are the same. In this way, the deployment of the contract is completed.

Preferably, the storage is a cache, and by caching in the memory, subsequent responses can be made more quickly. Specifically, the memory can be a cache area opened in the virtual machine. Of course, even if it is stored on a disk, the response speed can be improved to a certain extent in many cases.

After the deployment of the smart contract is completed, an invoking to the contract can be provided. In this way, the client device (which can be different from the client device that initiated the transaction for contract creation in S601) can initiate an invoking to the contract. For example, the client device initiates a transaction, where the to field is the address of the previously deployed smart contract, and the data field can include the method of the invoked contract and the input parameters, so as to implement the invoking of the deployed smart contract. Generally, after a batch of transactions including the transaction of the invoked contract have reached consensus, each consensus node executes the transaction separately. In the process of invoking a contract by a blockchain node, when the machine code of the smart contract is stored, because the machine code itself is directly executable by the CPU (under the control of the OS), the blockchain node can significantly increase the execution speed of smart contract. Moreover, the situation in which the machine code of the smart contract is cached in the memory can further improve the execution speed of the smart contract. Of course, even if it is stored on a disk, the execution speed can be improved to a certain extent. The blockchain node executes the machine code, specifically, it can execute the machine code corresponding to the invoked function in the stored contract.

In addition to EVM, the machine code in present specification can also be applied to Web Assembly (WASM) virtual machine, JavaScript Virtual Machine (JSVM), etc. There is no restriction here.

It should be noted that the blockchain node in S603 can be different from the blockchain node in S605. This is because the blockchain is a distributed system, and the node that receives the transaction, the node that initiates the consensus, and the node that executes the transaction can be different nodes, and of course they can be the same node.

The following introduces another embodiment of the method for deploying smart contract in present specification, including:

Step A: The blockchain node receives a transaction for creating a smart contract, the transaction includes the machine code of the smart contract, and the machine code is obtained by AoT compilation of the bytecode of the smart contract by the first trusted execution environment TEE.

Users can write smart contract in high-level languages. The written smart contract can be compiled by a compiler adapted to the high-level language to obtain bytecode. Furthermore, the user can compile the bytecode of the smart contract into machine code through the first TEE, and then package the machine code of the smart contract into the transaction through the client device and send it to the blockchain network. The format of the transaction is, for example, as shown in FIGS. 3 to 5, where the machine code of the smart contract to be created can be stored in the data field of the transaction.

The main body of the first TEE deployment can have many situations. For example, the first TEE can be deployed on the client device itself. After the client device compiles the bytecode of the smart contract into machine code in the first TEE, the machine code of the smart contract is packaged into the transaction and sent to the blockchain network. For another example, the first TEE can be deployed on a certain blockchain node, for example, it can be the blockchain node that receives the transaction in above-mentioned step A, or any other blockchain node in the blockchain network. When the first TEE is deployed on a blockchain node, the user can send the bytecode of the smart contract to the blockchain node through the off-chain channel, and after the bytecode of the smart contract be compiled into machine code by the blockchain node in the first TEE, it will be returned to the user; or, the user can create a transaction that invokes the smart contract on the client device, and include the bytecode of the smart contract in the data field of the transaction, the transaction invokes the smart contract deployed on the blockchain and used to implement the compilation function, so that the contract code of the smart contract is run in the first TEE to compile the bytecode into the corresponding machine code, and the client device can obtain the transaction receipt from the blockchain node, and the transaction receipt can include the machine code generated by the compilation. For another example, the above-mentioned compilation server can be a third-party server different from the client device and the blockchain node. The third-party server is used to provide compilation services to the outside. Then the user can send the bytecode of the smart contract to the third-party server, enables the third-party server to compile the bytecode of the smart contract into machine code in the first TEE. The third-party server can be a shared service platform that provides compilation services to all or at least some users. For example, the shared service platform can be deployed on a cloud server or in other forms, and present specification does not limit this.

When compiling the bytecode of the smart contract into machine code, the bytecode of the smart contract can be compiled into machine code through AoT. AoT compilation technology can improve the performance of smart contract execution. Specifically, it can be compiled in conjunction with the correlation of the program code, and the optimized and compiled machine code can be obtained. The execution efficiency of compiled and optimized machine code is generally higher than that of directly translated machine code. On the one hand, by providing the hardware and environment information of the blockchain node to the AoT engine, the compiled machine code has hardware+environment optimization, which can specifically include optimization in machine code generation, including instruction-level optimization, register allocation and optimization and so on. On the other hand, the AoT engine can analyze context information, such as the branch jump statement executed in the current function, and identify which sentence is the most likely to jump, so as to adjust the most likely jump to the front, so that it can hit the sentence of this branch first with a higher probability during execution; the compiler optimization process can also eliminate dead code through data flow analysis and/or active variable analysis, such as eliminating branches that will not be reached, and also including optimization for loop statements, common words expression replacement, etc.

Step B: The blockchain node completes the deployment of the smart contract when it is determined that the machine code is obtained by compiling the bytecode by a trusted TEE.

Compared with bytecode, machine code can perform much more operations, so the threat to the chain is relatively greater. For example, by tampering with the machine code of the smart contract, after the smart contract is invoked, the machine code can be run to read the private data stored on the blockchain node, such as the private data stored in a trusted execution environment (TEE) deployed on the blockchain node, can even affect the normal operation of the blockchain nodes, and undermine the security and stability of the blockchain network. Therefore, when the transaction for creating a smart contract contains the bytecode of the smart contract, the blockchain node is not restricted; when the transaction for creating the smart contract contains the machine code of the smart contract, the blockchain node can limit the TEE which compiles and generates the machine code, so as to ensure that only the machine code compiled and generated in the trusted TEE can be deployed on the blockchain.

The blockchain node can determine whether the TEE is a trusted TEE based on the signature generated in the first TEE. The blockchain node can obtain the machine code signature of the first TEE. After the first TEE compiles the bytecode into the machine code, the signature is generated by the private key maintained in the first TEE; accordingly, when the signature is successfully verified by a public key corresponding to the predefined trusted TEE mirror image, the blockchain node can determine that the first TEE is created by a trusted TEE mirror image. Then the compiled and generated machine code can be endorsed by the credibility of the trusted TEE mirror image, to determine that the first TEE is a trusted TEE and the machine code does not have security issues. Blockchain nodes can use the public key corresponding to the trusted TEE mirror image to verify the signature of the machine code by running the chain code. If the signature of the machine code is successfully verified by the public key corresponding to the trusted TEE mirror image, the blockchain node can determine that the first TEE is created by a trusted TEE mirror image. Or, the public key corresponding to the trusted TEE mirror image is recorded in the system contract, and the blockchain node can invoke the system contract and pass the signature contained in the transaction to the system contract, so that the contract code of the system contract is executed to verify the signature by the public key corresponding to the trusted TEE mirror image, and then the blockchain node receives the identification result returned by the system contract. The identification result is used to indicate whether the signature is successfully verified by the public key corresponding to the trusted TEE mirror image.

If the first TEE is created based on a trusted TEE mirror image, the first TEE can obtain the private key distributed by the Key Management Server after passing remote attestation, and the private key is maintained within the first TEE. For example, the first TEE can be an enclave generated based on SGX technology. Then, only when the compiler completes the compilation operation from bytecode to machine code in the TEE, will the machine code be signed based on the private key maintained within the TEE. Similarly, the blockchain node can obtain the public key corresponding to the trusted TEE mirror image from the KMS to ensure the reliability of the public key. Therefore, through the above-mentioned verification process, if the signature of the first TEE for the machine code is successfully verified by the public key corresponding to the trusted TEE mirror image, it indicates that the first TEE is indeed created based on the trusted TEE mirror image, and because the key must be maintained within the first TEE, it indicates that the machine code contained in the transaction is indeed compiled and generated in the first TEE, which ensures that the process of compiling bytecode to generate machine code is safe and reliable, and cannot be interfered by external factors, thus eliminate security risks and realize reliable endorsement of machine code security.

If the blockchain node identifies whether the first TEE is a trusted TEE by invoking the system contract, the blockchain node needs to invoke the system contract. In one case, the transaction for creating the smart contract can include the contract address of the system contract, so that the blockchain node can invoke the contract address during the execution of the transaction. In another case, the chain code of the blockchain node can include the contract address of the above-mentioned system contract and the invoking logic for the system contract. The triggering condition of the invoking logic can include: the blockchain node determines that the transaction type is a contract deployment type, for example, the to field of the contract deployment type transaction is empty. Then, when a blockchain node receives the contract deployment type transaction, it can automatically trigger the invoking of the above-mentioned system contract. And if the blockchain node only wants to restrict the deployment behavior of machine code type smart contract without restricting the deployment behavior of bytecode or other types of smart contract, then the trigger conditions for the above-mentioned invoking logic can also include: the contract deployment type transaction contains the machine code of the smart contract, so that the blockchain node will automatically trigger the invoking of the above-mentioned system contract only when the blockchain node receives a transaction that contains the machine code and is the contract deployment type.

A system contract is a special type of smart contract. For example, the system contract can be deployed in the genesis block. Or, although the system contract is deployed in a non-genesis block, the management authority of the system contract is the blockchain administrator, that is, the system contract is deployed by the blockchain administrator, and only the blockchain administrator can perform operations, such as version update, for the system contract, and different blockchain accounts can only invoke the system contract. Because the deployment operation of the machine code of the smart contract is involved, a system contract is usually used to ensure an accurate determination of whether the first TEE is a trusted TEE. Of course, even ordinary smart contract can also be used to implement the related functions implemented by the above-mentioned system contract to determine whether the first TEE is a trusted TEE, and present specification does not limit this.

In Ethereum and similar public chains, consortium chains, or private chain systems, blockchain node can initiate consensus on a batch of transactions. The batch of transactions can include the above-mentioned transaction for creating smart contract. After the consensus is reached, generally, each consensus node stores the machine code of the smart contract to be created locally. Each consensus node can locally execute the transaction for creating smart contract and create a corresponding contract account; and create an address for the contract account based on the same rules, and the addresses created by each consensus node for the same contract are the same. In this way, the deployment of the contract is completed.

Preferably, the storage is a cache, and by caching in the memory, subsequent responses can be made more quickly. Specifically, the memory can be a cache area opened in the virtual machine. Of course, even if it is stored on a disk, the response speed can be improved to a certain extent in many cases.

After the deployment of the smart contract is completed, an invoking to the contract can be provided. In this way, the client device (which can be different from the client device that initiated the transaction for contract creation in Step A) can initiate an invoking to the contract. For example, the client device initiates a transaction, where the to field is the address of the previously deployed smart contract, and the data field can include the method of the invoked contract and the input parameters, so as to implement the invoking of the deployed smart contract. Generally, after a batch of transactions including the transaction of the invoked contract have reached consensus, each consensus node executes the transaction separately. In the process of invoking a contract by a blockchain node, when the machine code of the smart contract is stored, because the machine code itself is directly executable by the CPU (under the control of the OS), the blockchain node can significantly increase the execution speed of smart contract. Moreover, the situation in which the machine code of the smart contract is cached in the memory can further improve the execution speed of the smart contract. Of course, even if it is stored on a disk, the execution speed can be improved to a certain extent. The blockchain node executes the machine code, specifically, it can execute the machine code corresponding to the invoked function in the stored contract.

In addition to EVM, the machine code in present specification can also be applied to WASM virtual machine, JSVM, etc. There is no restriction here.

It should be noted that the blockchain node in Step A can be different from the blockchain node in Step B. This is because the blockchain is a distributed system, and the node that receives the transaction, the node that initiates the consensus, and the node that executes the transaction can be different nodes, and of course they can be the same node.

Figure 7:
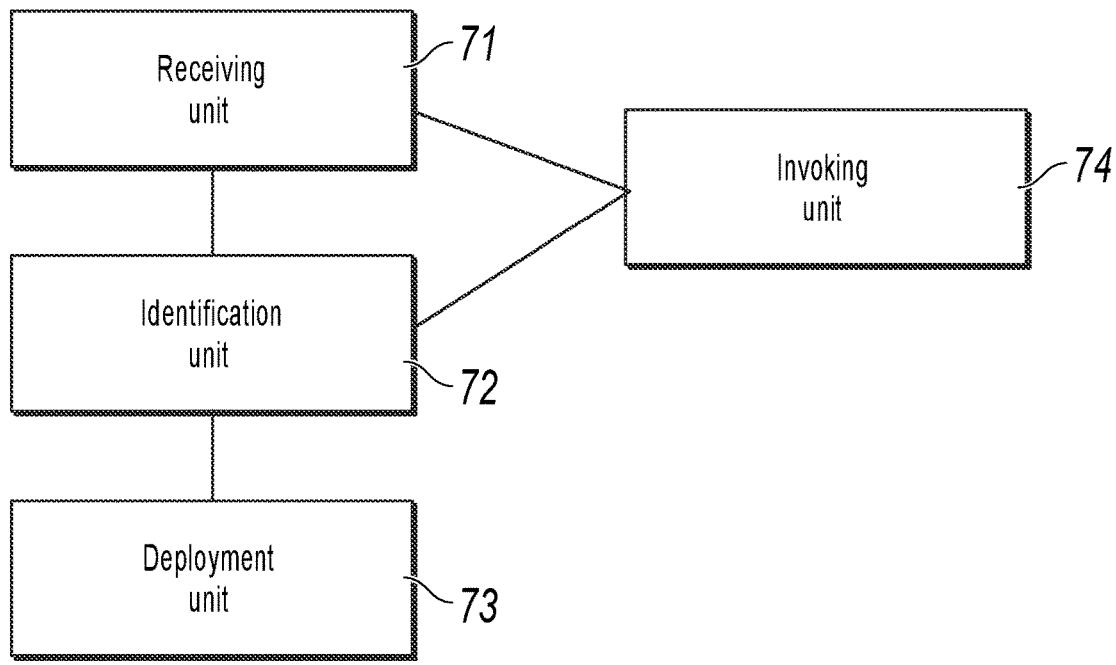
FIG. 7 is a block diagram of a blockchain node in an embodiment.

The following introduces an embodiment of a blockchain node deploying smart contract in present specification, as shown in FIG. 7, including:

a receiving unit 71, configured to receive a transaction for creating a smart contract, where the transaction includes the machine code of the smart contract, and the machine code is compiled with AoT from the bytecode of the smart contract by the first trusted execution environment TEE;

an identification unit 72, configured to identify whether the machine code is obtained by compiling the bytecode by a trusted TEE; and a deployment unit 73, configured to complete the deployment of the smart contract when it is determined that the machine code is obtained by compiling the bytecode by a trusted TEE.

Optionally, compiling the bytecode of the smart contract into the machine code by AoT compilation includes:

performing optimized compilation in the process of the AoT compilation for the bytecode of the smart contract.

Optionally, the first TEE is deployed on any of the following parties: the client device submitting the transaction, any blockchain node in the blockchain network, and a third-party server that is different from the client device and the blockchain node.

Optionally, the identification unit 72 is specifically configured to:

obtain the signature of the first TEE to the machine code through the private key from the transaction;

in a case where the signature is successfully verified by the public key corresponding to the predefined trusted TEE mirror image, determine that the first TEE is the trusted TEE.

Optionally, the private key is distributed to the first TEE by the key management server when it is determined that the first TEE passes remote certification.

Optionally, the trusted TEE mirror image includes: a mirror image of a trusted enclave based on software guard extensions SGX.

Optionally, the public key corresponding to the trusted TEE mirror image is recorded in the system contract; further including:

an invoking unit 74, configured to invoke the system contract and pass the signature in the system contract; and to receive the identification result returned by the system contract, where the identification result is used to indicate whether the signature is successfully verified by the public key corresponding to the trusted TEE mirror image.

Optionally, the invoking unit 74 is specifically configured to:

read the contract address of the system contract from the transaction, and invoking the system contract based on the contract address; or, in a case of determining that the transaction type is the contract deployment type, invoke the system contract based on the contract address of the system contract defined in the chain code.

Optionally, the system contract is deployed in the genesis block; or, the management authority of the system contract is the blockchain administrator.

Present specification also provides an embodiment of a blockchain node, including:

a processor, and a memory storing a program thereon, wherein when the processor executes the program, the smart contract is executed in the previously described methods.

Present specification also provides an embodiment of a storage medium for storing a program, wherein when the program is executed, the previously described methods are executed.

The system, device, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

In a typical configuration, a computing device includes one or more processors (CPU), one or more input/output interfaces, one or more network interfaces, and one or more memories.

The memory may include a non-persistent memory, a random access memory (RAM), and/or a nonvolatile memory and other forms that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, a quantum memory, a graphene-based storage medium or another magnetic storage device, or any other non-transmission medium. The computer storage medium can be used to store information accessible by a computing device. As described in the present specification, the computer readable medium does not include computer-readable transitory media such as a modulated data signal and a carrier.

It should also be noted that the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. Without more restrictions, an element defined by the sentence "includes a . . . " does not exclude the existence of another element in the process, method, product, or device that includes the element.

Specific embodiments of the present specification are described above. Other embodiments fall within the scope of the appended claims. In some situations, the actions or steps described in the claims can be performed in an order different from the order in the embodiment and the expected results can still be achieved. In addition, the process depicted in the accompanying drawings does not necessarily require a particular order or a sequential order as shown to achieve the expected results. In some embodiments, multitasking and parallel processing are also possible or may be advantageous.

The terms used in one or more embodiments of the present specification are for the purpose of describing particular embodiments only and are not intended to limit one or more embodiments of the present specification. The singular forms of "a", "said" and "the" used in one or more embodiments of the present specification and the appended claims are also intended to include the plural forms, unless other meanings are clearly indicated by the context. It should also be understood that the term "and/or" used herein refers to and includes any or all possible combinations of one or more associated listed items.

It should be understood that although the terms first, second, third, etc. may be used to describe various information in one or more embodiments of the present specification, the information should not be limited to these terms. These terms are only used to distinguish the information of the same type from each other. For example, the first information can also be referred to as the second information, and similarly, the second information can also be referred to as the first information without departing from the scope of one or more embodiments of the present specification. Depending on the context, the word "if" used herein can be explained as "in the case of", "when" or "in response to determine".

The previous descriptions are preferred embodiments of one or more embodiments of the present specification, and are not intended to limit one or more embodiments of the present specification. Any modification, equivalent replacement, or improvement made without departing from the spirit and principle of one or more embodiments of the present specification shall fall within the scope of the claims in one or more embodiments of the present specification.

What is claimed is:

1. A computer-implemented method, comprising:
receiving, by a blockchain node in a blockchain network, a transaction for creating a smart contract, wherein the transaction comprises a machine code of the smart contract, and the machine code of the smart contract is obtained by Ahead of Time (AoT) compilation of a bytecode of the smart contract in a first trusted execution environment (TEE), wherein the first TEE comprises a safe extension of central processing unit (CPU) hardware and provides isolated code execution of an application running in the TEE;
determining, by the blockchain node, that compilation of the smart contract that compiles the bytecode of the smart contract to the machine code of the smart contract is performed in a trusted TEE, which indicates that the machine code of the smart contract is trusted; and
in response to determining that the machine code of the smart contract is obtained by the trusted TEE, completing, by the blockchain node, a deployment of the smart contract.

2. The computer-implemented method of claim 1, wherein the AoT compilation of the bytecode of the smart contract comprises:
performing an optimization in a process of the AoT compilation of the bytecode of the smart contract.

3. The computer-implemented method of claim 1, wherein the first TEE is deployed on any one of: a client device that submits the transaction, any blockchain node in the blockchain network, or a third-party server different from the client device and the blockchain node.

4. The computer-implemented method of claim 1, wherein determining, by the blockchain node, that the machine code of the smart contract is obtained by the trusted TEE comprises:
obtaining, by the blockchain node from the transaction, a signature of the machine code generated by the first TEE by using a private key;
verifying, by the blockchain node, the signature using a public key corresponding to a predefined trusted TEE mirror image; and
in response to determining that the signature is verified using the public key, determining, by the blockchain node, that the first TEE is the trusted TEE.

5. The computer-implemented method of claim 4, wherein the private key is distributed to the first TEE by a key management server in response to determining that the first TEE passes remote certification.

6. The computer-implemented method of claim 4, wherein the predefined trusted TEE mirror image comprises: a mirror image of a trusted enclave based on software guard protection (SGX).

7. The computer-implemented method of claim 4, wherein the public key corresponding to the predefined trusted TEE mirror image is recorded in a system contract; the method further comprises:
invoking, by the blockchain node, the system contract;
passing, by the blockchain node, the signature to the system contract; and
receiving, by the blockchain node, an identification result returned by the system contract, wherein the identification result indicates whether the signature is verified by the public key corresponding to the predefined trusted TEE mirror image.

8. The computer-implemented method of claim 7, wherein invoking, by the blockchain node, the system contract comprises:
reading, by the blockchain node, a contract address of the system contract from the transaction; and
invoking, by the blockchain node, the system contract based on the contract address.

9. The computer-implemented method of claim 7, wherein invoking, by the blockchain node, the system contract comprises:
in response to determining that a transaction type of the transaction is a contract deployment type, invoking, by the blockchain node, the system contract based on a contract address of the system contract defined in a chain code of the blockchain node.

10. The computer-implemented method of claim 7, wherein the system contract is deployed in a genesis block; or, a management authority of the system contract is a blockchain administrator.

11. A non-transitory, computer-readable medium storing one or more instructions executable by a computer system to perform operations comprising:
receiving, by a blockchain node in a blockchain network, a transaction for creating a smart contract, wherein the transaction comprises a machine code of the smart contract, and the machine code of the smart contract is obtained by Ahead of Time (AoT) compilation of a bytecode of the smart contract in a first trusted execution environment (TEE), wherein the first TEE comprises a safe extension of central processing unit (CPU) hardware and provides isolated code execution of an application running in the TEE;

determining, by the blockchain node, that compilation of the smart contract that compiles the bytecode of the smart contract to the machine code of the smart contract is performed in a trusted TEE, which indicates that the machine code of the smart contract is trusted; and in response to determining that the machine code of the smart contract is obtained by the trusted TEE, completing, by the blockchain node, a deployment of the smart contract.

12. The non-transitory, computer-readable medium of claim 11, wherein the first TEE is deployed on any one of: a client device that submits the transaction, any blockchain node in the blockchain network, or a third-party server different from the client device and the blockchain node.

13. The non-transitory, computer-readable medium of claim 11, wherein determining, by the blockchain node, that the machine code of the smart contract is obtained by the trusted TEE comprises:

obtaining, by the blockchain node from the transaction, a signature of the machine code generated by the first TEE by using a private key;

verifying, by the blockchain node, the signature using a public key corresponding to a predefined trusted TEE mirror image; and in response to determining that the signature is verified using the public key, determining, by the blockchain node, that the first TEE is the trusted TEE.

14. The non-transitory, computer-readable medium of claim 13, wherein the private key is distributed to the first TEE by a key management server in response to determining that the first TEE passes remote certification.

15. The non-transitory, computer-readable medium of claim 13, wherein the public key corresponding to the predefined trusted TEE mirror image is recorded in a system contract; the operations further comprise:

invoking, by the blockchain node, the system contract;

passing, by the blockchain node, the signature to the system contract; and receiving, by the blockchain node, an identification result returned by the system contract, wherein the identification result indicates whether the signature is verified by the public key corresponding to the predefined trusted TEE mirror image.

16. A computer-implemented system, comprising:
one or more computers; and
one or more computer memory devices interoperably coupled with the one or more computers and having tangible, non-transitory, machine-readable media storing one or more instructions that cause the one or more computers to perform one or more operations comprising:

receiving, by a blockchain node in a blockchain network, a transaction for creating a smart contract, wherein the transaction comprises a machine code of the smart contract, and the machine code of the smart contract is obtained by Ahead of Time (AoT) compilation of a bytecode of the smart contract in a first trusted execution environment (TEE), wherein the first TEE comprises a safe extension of central processing unit (CPU) hardware and provides isolated code execution of an application running in the TEE;

determining, by the blockchain node, that compilation of the smart contract that compiles the bytecode of the smart contract to the machine code of the smart contract is performed in a trusted TEE, which indicates that the machine code of the smart contract is trusted; and in response to determining that the machine code of the smart contract is obtained by the trusted TEE, completing, by the blockchain node, a deployment of the smart contract.

17. The computer-implemented system of claim 16, wherein the first TEE is deployed on any one of: a client device that submits the transaction, any blockchain node in the blockchain network, or a third-party server different from the client device and the blockchain node.

18. The computer-implemented system of claim 16, wherein determining, by the blockchain node, that the machine code of the smart contract is obtained by the trusted TEE comprises:

obtaining, by the blockchain node from the transaction, a signature of the machine code generated by the first TEE by using a private key;

verifying, by the blockchain node, the signature using a public key corresponding to a predefined trusted TEE mirror image; and in response to determining that the signature is verified using the public key, determining, by the blockchain node, that the first TEE is the trusted TEE.

19. The computer-implemented system of claim 18, wherein the private key is distributed to the first TEE by a key management server in response to determining that the first TEE passes remote certification.

20. The computer-implemented system of claim 18, wherein the public key corresponding to the predefined trusted TEE mirror image is recorded in a system contract; the one or more operations further comprise:

invoking, by the blockchain node, the system contract;
passing, by the blockchain node, the signature to the system contract; and receiving, by the blockchain node, an identification result returned by the system contract, wherein the identification result indicates whether the signature is verified by the public key corresponding to the predefined trusted TEE mirror image.

21. A computer-implemented method, comprising:
sending, by a device, a bytecode of a smart contract to a first trusted execution environment (TEE), wherein the first TEE comprises a safe extension of central processing unit (CPU) hardware and provides isolated code execution of an application running in the TEE;

receiving, by the device, a machine code of the smart contract obtained by Ahead of Time (AoT) compilation of the bytecode of the smart contract that is performed in the first TEE, wherein the machine code, obtained by AoT compilation in the first TEE, is trusted; and sending, by the device to a blockchain node of a blockchain network, a transaction for creating the smart contract, wherein the transaction comprises the machine code of the smart contract, and the machine code of the smart contract is used for deployment of the smart contract in the blockchain network.

* * * * *